United States Patent [19]

Chu

[11] 4,388,415
[45] Jun. 14, 1983

[54] HIGH VOLTAGE DIELECTRIC (SRT I03)

[75] Inventor: Mike S. Chu, State College, Pa.

[73] Assignee: Erie Technological Products, Inc., Erie, Pa.

[21] Appl. No.: 306,960

[22] Filed: Sep. 30, 1981

[51] Int. Cl.$^3$ .............................................. C04B 35/00
[52] U.S. Cl. ...................................................... 501/136
[58] Field of Search .......................................... 501/136

[56] References Cited

U.S. PATENT DOCUMENTS 4,119,554  10/1978  Fujiwara ........................ 501/136

FOREIGN PATENT DOCUMENTS 53-25899  3/1978  Japan ................................ 501/136

*Primary Examiner*—James Poer
*Attorney, Agent, or Firm*—Ralph Hammar

[57] ABSTRACT

A ceramic dielectric composition is provided including 63.96 to 73.72 mole % $SrTiO_3$, 17.90 to 24.04 mole % $TiO_2$, and 8.11 to 12.00 mole % $Bi_2O_3$ and further including 0 to 8 weight % NiO, 0 to 1.11 weight % $La_2O_3$, 0 to 2.94 weight % $SiO_2$ and 0 to 0.32 weight % MnO. The said weight %, where mentioned, is with respect to the total weight of the above mentioned three compounds, $SrTiO_3$, $TiO_2$ and $Bi_2O_3$.

These ceramic dielectric compositions have high dielectric constants and low dielectric losses (dissipation factors). Also, the variation of dielectric constant and dissipation factor with respect to temperature, applied AC voltage, and applied DC voltage are very small.

7 Claims, 4 Drawing Figures

HIGH VOLTAGE DIELECTRIC (SRT 103)

DESCRIPTION

It is well known that paraelectric $SrTiO_3$ has advantages over $BaTiO_3$ in formulating ceramic capacitors due to its small variation of dielectric constant and dissipation factor with respect to applied AC and DC voltage. Also, its piezoelectric effect is much smaller. However, its dielectric constant, 200-250, is very low as compared to ferroelectric $BaTiO_3$, 1500. Also the variation of dielectric constant with respect to temperature, $-3000$ ppm, is high. Utilizing $SrTiO_3$, as a ceramic capacitor is then not practical because of these two deficiencies.

It is also well known that these deficiencies can be greatly improved by incorporating $SrTiO_3$ with $TiO_2$ and $Bi_2O_3$. It is believed that when the $SrTiO_3$—$TiO_2$—$Bi_2O_3$ ternary composition are sintered, the bismuth ion replaces the strontium ion and creates lattice distortion. This further creates multi-equilibrium sites for the titanium ions. Dielectric constant as high as 1450 could be originated from the relaxation of titanium ions with respect to its equilibrium positions.

The present invention relates to a composition based on the $SrTiO_3$—$TiO_2$—$Bi_2O_3$ ternary composition. The ceramic composition is formulated by further incorporating NiO, $La_2O_3$, MnO and $SiO_2$ into the basic ceramic dielectrics. The invention results a ceramic dielectric which has a high dielectric constant, a low dielectric loss. The variation of such dielectric constant and dielectric loss with respect to temperature and applied AC and DC voltage are also very small. Such ceramic compositions are very useful when fabricated into ceramic disc capacitors and utilized in certain high AC/DC voltage apparatuses or circuits.

Figure 1:
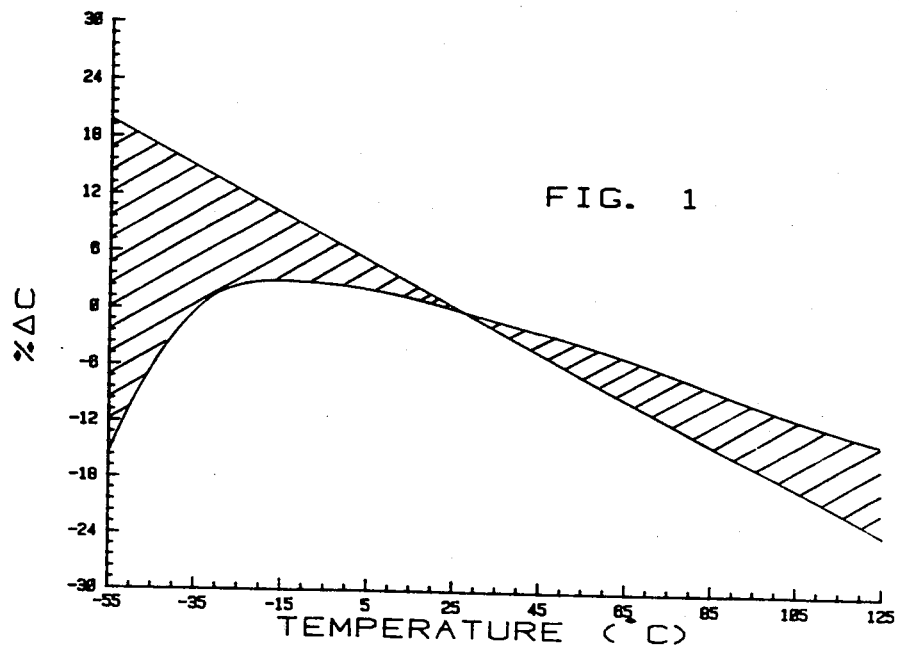
FIG. 1 shows the variation of the dielectric constant, Ks, or capacitance with respect to temperature, by %, for the ceramic dielectrics which are within the limits of the present invention.
Figure 2:
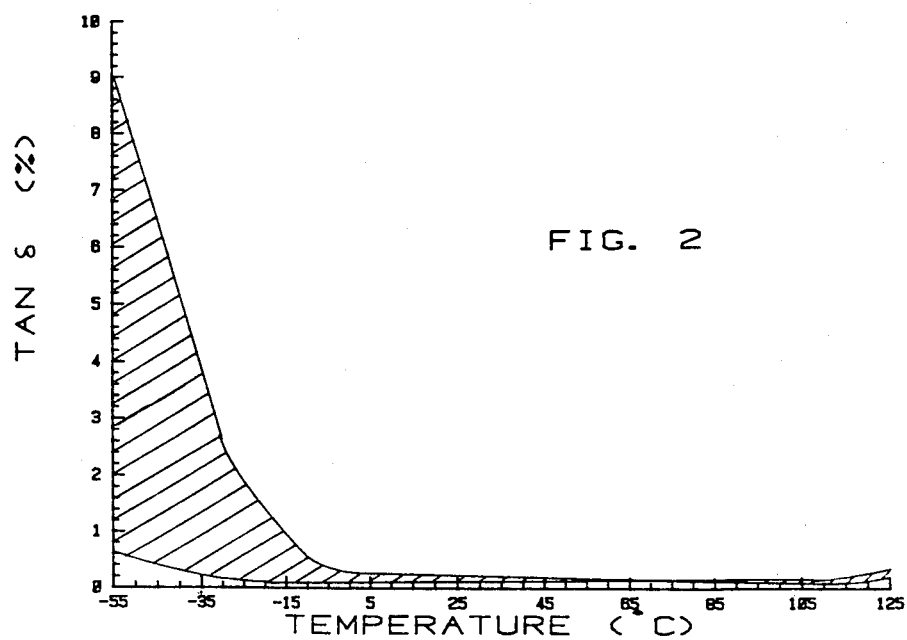
FIG. 2 shows the variation of the dielectric loss or dissipation factor, tan δ by %, for the ceramic dielectrics which are within the limits of the present invention.
Figure 3:
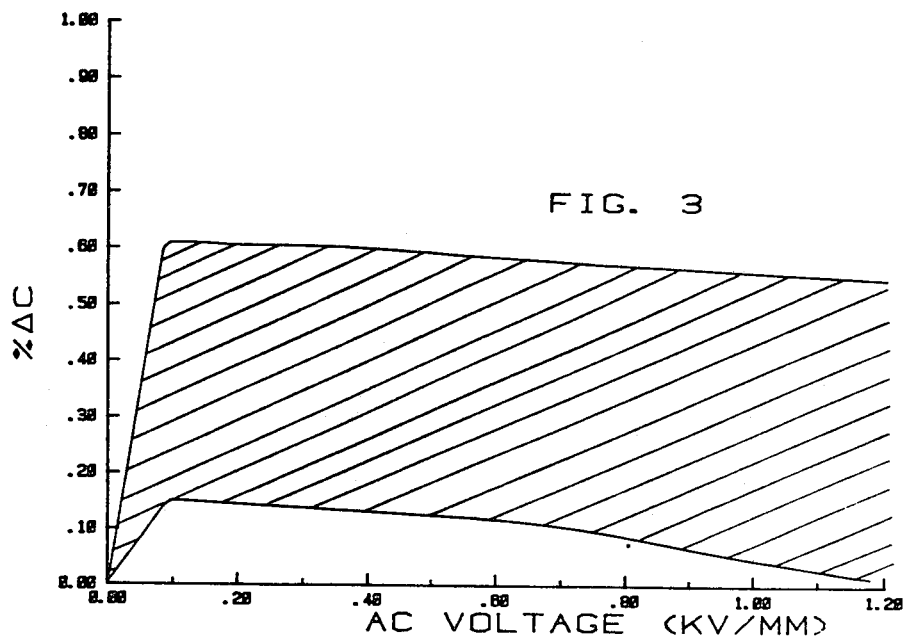
FIG. 3 shows the variation of the dielectric constant, Ks, or capacitance with respect to the applied AC voltage, by %, for the ceramic dielectrics which are within the limits of the present invention.
Figure 4:
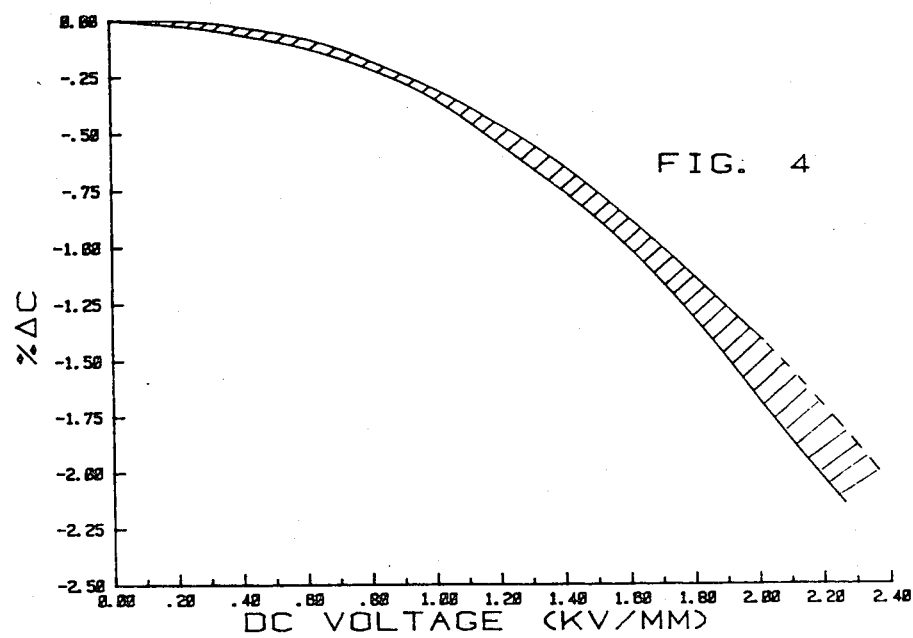
FIG. 4 shows the variation of the dielectric constant, Ks, or capacitance with respect to the applied DC voltage, by %, for the ceramic dielectrics which are within the limits of the present invention.

The present invention will be described in the following examples.

EXAMPLE 1

Powdered $SrCO_3$, $TiO_2$, and $Bi_2O_3$ in the molar ratio of 39.02:53.67:7.32 are mixed, milled, and dried according to the conventional ceramic process. The dried mixture is then crushed into powder and calcined at 1120° C. for three hours. The calcined powder is milled again with powdered NiO added according to the weight percent as indicated in Table 1. The slurry is then added with a binder, such as PVA, dried, pulverized again, and finally pressed into discs of 9.0 mm diameter and 1.0 mm thickness. These discs are then sintered at 1150° C. to 1260° C. for 3 hours to obtain a dense ceramic body. The two major faces of the sintered ceramic discs are than painted with silver electrode paste and heated in air to 750° C. to provide conductive electrodes. Leads and insulating coatings are then applied onto the ceramics for electrical testing.

Column 1 to 7 of Table 2 show the various electric characteristics of the respective specimens. The dielectric constant Ks at 1 KHz, 1 VRMS, the dielectric loss factor tan δ, by % at 1 KHz and 1 MHz, 1 VRMS, the capacitance change $\Delta C_1$ by %, and the dielectric loss factor tan δ, by % at 60 Hz, 600 V/mm, the capacitance change $\Delta C_2$, by % at DC, 2 KV/mm, the capacitance change $\Delta C_3$, by %, at $-55°$ C., $-30°$ C., $+85°$ C. and $+125°$ C., the insulation resistance at DC, 1 KV/mm at 25° C., 85° C., and 125° C. and the DC breakdown voltage of respective specimens are shown in the columns 1, 2, 3, 4, 5, 6, and 7 respectively.

The capacitance change $\Delta C_1$, $\Delta C_2$, and $\Delta C_3$ in Table 2, and thereafter, are defined as follows, wherein C indicated values of the capacitance at respective testing conditions.

$$\Delta C_1 = \frac{C(@60Hz, 600V/mm) - C(@1KHz, 1VRMS)}{C(@1KHz, 1VRMS)} \times 100\%$$

$$\Delta C_2 = \frac{C(@DC, 2KV/mm) - C(@1KHz, 5VRMS)}{C(@1KHz, 5VRMS)} \times 100\%$$

$$\Delta C_3 = \frac{C(@1KHz,1VRMS, -55° C., -30° C.,85° C.,125° C.) - C(@1KHz,1VRMS,25° C.)}{C(@1KHz, 1VRMS 25° C.)} \times 100\%$$

As shown in Table 2, the specimens which are within the limits of Example 1 have a high dielectric constant, Ks, from 990 to 1230, a low dielectric loss factor, tan δ, from 0.02 to 0.30. The variation of capacitance with respect to applied DC and AC voltages are also very small for these specimens. As also shown in Table 2, the addition of NiO, within the limit of this invention, into the basic ceramic composition given in Sample No. 1 has an unique advantage of improving its capacitance change with respect to temperature.

EXAMPLE 2

A ceramic composition was made up comprising:
$SrCO_3$: 39.02 mole %
$TiO_2$: 53.67 mole %
$Bi_2O_3$: 7.32 mole %

The composition was processed in a similar way to Example 1 to obtain a calcined ceramic powder mixture. To this calcined mixture NiO, in 4.0 weight %, and $La_2O_3$, in weight % as indicated in Table 3 are added and then processed exactly as in Example 1 to obtain sintered dense ceramic discs. The electrical properties of these capacitor sepcimens are then tested. The results are shown in Table 4. These tests are peformed under the same conditions as illustrated in Example 1.

As can be seen in column 2 of Table 4, the addition of $La_2O_3$ or other rare earth oxides into the basic ceramic composition improves its dielectric loss at high frequencies. Also the insulation resistance at high temperatures are significantly improved. The other electrical properties are not deteriorated by the additon of rare earth oxides.

EXAMPLE 3

Powdered $SrTiO_3$, $TiO_2$, $Bi_2O_3$, NiO, $La_2O_3$, $SiO_2$, and MnO are mixed and milled according to the composition as indicated in Table 5. It should be noted that $La_2O_3$ and MnO could also be added into the ceramic mixture in their carbonate forms as $La_2(CO_3)_2$, and $MnCO_3$. The ceramic mix are then added with binder, such as PVA, dried, pulverized, and pressed into discs as illustrated in Example 1 and Example 2. It should be noted that in this example, $SrTiO_3$ is used as starting material and no precalcining of the powder mixture is necessary. Sample No. 21, which has the ceramic composition within the limit of the present invention, is prepared from $SrCO_3$, $TiO_2$, and $Bi_2O_3$ with process identical to that as illustrated in Examples 1 and 2. The electrical characteristics for these samples are shown in Table 6.

As can be seen in Table 6, for specimen No. 12, 15, and 21 that the $Bi_2O_3/SrTiO_3$ molar ratio in the basic ceramic composition has significant influence on the electrical characteristics. When the $Bi_2O_3/SrTiO_3$ ratio increases, the variation of dielectric constant with respect to temperature becomes smaller, and the dielectric constant becomes higher. However, the dissipation factor also increases with increasing $Bi_2O_3/SrTiO_3$. To utilize the present ceramic system, therefore, the optimum $Bi_2O_3/SrTiO_3$ ratio can be selected to meet specific application needs.

As also seen in Table 6 for specimens No. 13, No. 19 and No. 16, No. 17, No. 18 that incorporating $SiO_2$ into the basic ceramic system slightly improves the dissipation factor at 1 KHz. However, the dielectric constant and capacitance change with respect to AC applied voltage are noticably deteriorated. The incorporation of $SiO_2$ also reduces sintering temperature significantly.

Comparing specimen No. 15 and No. 20 shows that with MnO addition into the ceramic system, the capacitance change with respect to DC voltage can be further improved slightly with some deterioration in the dielectric constant.

The effects of NiO, and $La_2O_3$ on the electrical characteristics of the ceramic composition as presented in Example 3 are identical to that described in Example 1 and Example 2.

TABLE 1

| Specimen | Mole % | | Weight % | |
|---|---|---|---|---|
| No. | $SrCO_3$ | $TiO_2$ | $Bi_2O_3$ | NiO |
| 1 | 39.01 | 53.67 | 7.32 | 0.00 |
| 2 | 39.01 | 53.67 | 7.32 | 1.00 |
| 3 | 39.01 | 53.67 | 7.32 | 2.00 |
| 4 | 39.01 | 53.67 | 7.32 | 3.00 |
| 5 | 39.01 | 53.67 | 7.32 | 4.00 |
| 6 | 39.01 | 53.67 | 7.32 | 5.00 |
| 7 | 39.01 | 53.67 | 7.32 | 8.00 |

TABLE 2

| | 1 | 2 | | 3 | | 4 |
|---|---|---|---|---|---|---|
| Specimen No | Ks at 1KHz, 1VRMS | tan δ (%) at 1KHz, 1VRMS | tan δ (%) at 1MHz, 1VRMS | $\Delta C_1$ (%) at 60Hz, 600V/mm | tan δ (%) at 60Hz, 600V/mm | $\Delta C_2$ (%) at DC, 2KV/mm |
| 1 | 995 | 0.21 | 0.69 | 2.21 | 1.93 | −2.04 |
| 2 | 1115 | 0.07 | 1.08 | 0.88 | 0.48 | −1.57 |
| 3 | 1210 | 0.02 | 2.13 | 0.41 | 0.10 | −1.32 |
| 4 | 1225 | 0.06 | 2.57 | 1.16 | 0.13 | −0.99 |
| 5 | 1230 | 0.06 | 3.19 | 1.01 | 0.13 | −0.93 |
| 6 | 1190 | 0.08 | 3.84 | 1.03 | 0.13 | −0.94 |
| 7 | 1100 | 0.13 | 4.71 | 1.14 | 0.15 | −0.94 |

| | 5 | | | | 6 | | | 7 |
|---|---|---|---|---|---|---|---|---|
| Specimen No | $\Delta C_3$ (%) at | | | | Insulation Resistance (ohm) at 1000V | | | Breakdown Voltage KV/mm |
| | −55° C. | −30° C. | +85° C. | +125° C. | +25° C. | +85° C. | +125° C. | |
| 1 | +19.0 | +13.4 | −12.5 | −20.8 | $2.8 \times 10^{13}$ | $2.6 \times 10^{13}$ | $7.4 \times 10^{12}$ | 5.2 |
| 2 | +14.0 | +10.7 | −12.4 | −20.5 | $4.5 \times 10^{13}$ | $5.8 \times 10^{13}$ | $1.9 \times 10^{13}$ | 3.4 |
| 3 | +8.8 | +8.2 | −11.0 | −18.8 | $5.8 \times 10^{13}$ | $3.8 \times 10^{13}$ | $2.1 \times 10^{13}$ | 2.3 |
| 4 | +4.5 | +6.8 | −10.1 | −17.8 | $4.5 \times 10^{13}$ | $2.4 \times 10^{13}$ | $6.5 \times 10^{12}$ | 3.1 |
| 5 | −0.8 | +6.1 | −8.8 | −16.1 | $4.1 \times 10^{13}$ | $1.4 \times 10^{13}$ | $2.1 \times 10^{12}$ | 4.6 |
| 6 | −6.8 | +4.3 | −8.5 | −15.4 | $2.7 \times 10^{13}$ | $1.5 \times 10^{12}$ | $1.7 \times 10^{11}$ | 4.3 |
| 7 | −15.6 | +1.7 | −7.9 | −14.7 | $7.9 \times 10^{12}$ | $2.0 \times 10^{11}$ | $2.1 \times 10^{10}$ | 3.9 |

TABLE 3

| Specimen | Mole % | | | Weight % | Weight % |
|---|---|---|---|---|---|
| No. | $SrCO_3$ | $TiO_2$ | $Bi_2O_3$ | NiO | $La_2O_3$ |
| 1 | 39.01 | 53.67 | 7.32 | 0.0 | 0.00 |
| 5 | 39.01 | 53.67 | 7.32 | 4.0 | 0.00 |
| 8 | 39.01 | 53.67 | 7.32 | 4.0 | 0.33 |
| 9 | 39.01 | 53.67 | 7.32 | 4.0 | 0.56 |
| 10 | 39.01 | 53.67 | 7.32 | 4.0 | 0.89 |
| 11 | 39.01 | 53.67 | 7.32 | 4.0 | 1.11 |

TABLE 4

| | 1 | 2 | | 3 | | 4 |
|---|---|---|---|---|---|---|
| Specimen No. | Ks at 1KHz, 1VRMS | tan δ (%) at 1KHz, 1VRMS | tan δ (%) at 1MHz, 1VRMS | $\Delta C_1$ (%) at 60Hz, 600V/mm | tan δ (%) at 60Hz, 600V/mm | $\Delta C_2$ (%) at DC, 2KV/mm |
| 1 | 995 | 0.21 | 0.69 | 2.21 | 1.93 | −2.04 |
| 5 | 1230 | 0.06 | 3.19 | 1.01 | 0.13 | −0.93 |
| 8 | 1105 | 0.05 | 1.90 | 1.10 | 0.10 | −1.00 |
| 9 | 1130 | 0.05 | 2.05 | 1.02 | 0.10 | −0.85 |
| 10 | 1100 | 0.05 | 1.91 | 1.09 | 0.10 | −0.96 |
| 11 | 1080 | 0.05 | 1.72 | 0.96 | 0.10 | −0.88 |

| | 5 | 6 | 7 |
|---|---|---|---|
| Specimen | $\Delta C_3$ (%) at | Insulation Resistance (ohm) at 1000V | Breakdown Voltage |

TABLE 4-continued

| No. | −55° C. | −30° C. | +85° C. | +125° C. | +25° C. | +85° C. | +125° C. | KV/mm |
|---|---|---|---|---|---|---|---|---|
| 1 | +19.0 | +13.4 | −12.5 | −20.8 | $2.8 \times 10^{13}$ | $2.6 \times 10^{13}$ | $7.4 \times 10^{12}$ | 5.2 |
| 5 | +0.8 | +10.7 | −8.8 | −16.1 | $4.1 \times 10^{13}$ | $1.4 \times 10^{13}$ | $2.1 \times 10^{12}$ | 3.4 |
| 8 | +7.18 | +7.3 | −10.2 | −17.5 | $7.6 \times 10^{13}$ | $6.3 \times 10^{13}$ | $2.3 \times 10^{13}$ | 3.1 |
| 9 | +6.1 | +7.0 | −10.1 | −17.5 | $9.0 \times 10^{13}$ | $4.4 \times 10^{13}$ | $1.9 \times 10^{13}$ | 3.6 |
| 10 | +6.8 | +7.1 | −10.0 | −17.3 | $7.8 \times 10^{13}$ | $3.0 \times 10^{13}$ | $1.1 \times 10^{13}$ | 4.5 |
| 11 | +7.52 | +7.1 | −10.2 | −17.5 | $1.3 \times 10^{14}$ | $3.8 \times 10^{13}$ | $1.2 \times 10^{13}$ | 4.1 |

TABLE 5

| Sample # | $SrTiO_3$ Mole % | $TiO_2$ Mole % | $Bi_2O_3$ Mole % | NiO Weight % | $La_2O_3$ Weight % | $SiO_2$ Weight % | MnO Weight % |
|---|---|---|---|---|---|---|---|
| 12 | 73.72 | 18.17 | 8.11 | 3.99 | 0.29 | 0.00 | 0.00 |
| 13 | 72.63 | 17.90 | 9.47 | 2.57 | 0.28 | 0.00 | 0.00 |
| 14 | 72.63 | 17.90 | 9.47 | 3.24 | 0.28 | 0.00 | 0.00 |
| 15 | 72.63 | 17.90 | 9.47 | 4.19 | 0.28 | 0.00 | 0.00 |
| 16 | 72.63 | 17.90 | 9.47 | 3.24 | 0.28 | 0.35 | 0.00 |
| 17 | 72.63 | 17.90 | 9.47 | 3.24 | 0.28 | 0.70 | 0.00 |
| 18 | 72.63 | 17.90 | 9.47 | 3.24 | 0.28 | 1.51 | 0.00 |
| 19 | 72.63 | 17.90 | 9.47 | 2.57 | 0.28 | 2.94 | 0.00 |
| 20 | 72.63 | 17.90 | 9.47 | 4.19 | 0.28 | 0.00 | 0.32 |
| 21* | 63.96 | 24.04 | 12.00 | 2.50 | 0.50 | 0.00 | 0.00 |

*Calcined from
39.01 mole % $SrCO_3$
53.67 mole % $TiO_2$
7.32 mole % $Bi_2O_3$

TABLE 6

| Sample No | 1 Ks at | | 2 tan δ (%) | | 3 $\Delta C_1$ (%) at 60Hz, 600V/mm | tan δ (%) at 60Hz, 600V/mm | 4 $\Delta C_2$ (%) at DC, 2KV/mm |
|---|---|---|---|---|---|---|---|
| | 1KHz, 1VRMS | 1MHz, 1VRMS | 1KHz, 1VRMS | 1MHz, 1VRMS | | | |
| 12 | 685 | 680 | 0.040 | 0.56 | 1.08 | 0.10 | −1.97 |
| 13 | 790 | 780 | 0.043 | 0.78 | 0.60 | 0.10 | −1.95 |
| 14 | 735 | 730 | 0.051 | 0.98 | 0.62 | 0.10 | −1.64 |
| 15 | 755 | 750 | 0.057 | 0.89 | 1.04 | 0.10 | −2.00 |
| 16 | 640 | 635 | 0.048 | 0.84 | 1.36 | 0.10 | −1.83 |
| 17 | 565 | 560 | 0.049 | 0.67 | 1.56 | 0.10 | −1.74 |
| 18 | 630 | 625 | 0.033 | 1.14 | 1.65 | 0.10 | −1.80 |
| 19 | 410 | 410 | 0.023 | 0.81 | 0.87 | 0.10 | −2.05 |
| 20 | 670 | 665 | 0.073 | 0.87 | 0.99 | 0.10 | −1.67 |
| 21 | 1035 | 1030 | 0.027 | 1.32 | 0.96 | 0.10 | −0.99 |

| Sample No | 5 $\Delta C_3$ (%) | | | | 6 Insulation Resistance (ohm) at 1000V/mm | | | 7 Breakdown Voltage KV/mm |
|---|---|---|---|---|---|---|---|---|
| | −55° C. | −30° C. | +85° C. | +125° C. | +25° C. | +85° C. | +125° C. | |
| 12 | +19.4 | +13.8 | −14.3 | −23.2 | $3.3 \times 10^{12}$ | $1.2 \times 10^{12}$ | $2.5 \times 10^{11}$ | 6.2 |
| 13 | +15.4 | +11.4 | −13.1 | −21.8 | $1.9 \times 10^{13}$ | $4 \times 10^{12}$ | $9.8 \times 10^{11}$ | 5.7 |
| 14 | +13.7 | +10.6 | −12.7 | −21.2 | $8.5 \times 10^{12}$ | $8.7 \times 10^{11}$ | $9.6 \times 10^{10}$ | 6.7 |
| 15 | +14.3 | +11.1 | −12.8 | −21.2 | $1.3 \times 10^{13}$ | $3.2 \times 10^{12}$ | $1.2 \times 10^{12}$ | 7.0 |
| 16 | +15.1 | +11.4 | −13.1 | −21.7 | $1.1 \times 10^{13}$ | $2.3 \times 10^{12}$ | $8.8 \times 10^{11}$ | 7.2 |
| 17 | +17.3 | +12.6 | −13.9 | −22.8 | $1.2 \times 10^{13}$ | $1.6 \times 10^{12}$ | $6.1 \times 10^{11}$ | 6.9 |
| 18 | +13.6 | +10.5 | −11.7 | −19.6 | $9.9 \times 10^{12}$ | $1.3 \times 10^{12}$ | $3.9 \times 10^{11}$ | 6.9 |
| 19 | +15.6 | +11.1 | −11.8 | −19.5 | $9.6 \times 10^{12}$ | $3.6 \times 10^{12}$ | $1.6 \times 10^{12}$ | 7.3 |
| 20 | +14.1 | +10.9 | −12.8 | −21.3 | $3.5 \times 10^{12}$ | $1.9 \times 10^{12}$ | $5.5 \times 10^{11}$ | 7.3 |
| 21 | +10.9 | +8.5 | −10.3 | −17.9 | $1.2 \times 10^{12}$ | $1.1 \times 10^{11}$ | $8.8 \times 10^{9}$ | 3.8 |

I claim:

1. A ceramic dielectric composition consisting essentially of 63 to 74 mole % of $SrTiO_3$, 17 to 25 mole % $TiO_2$, and 9 to 12 mole % $Bi_2O_3$ and further including 1 to 8 weight % NiO based on the total weight of the above mentioned three compounds $SrTiO_3$, $TiO_2$, and $Bi_2O_3$, the ceramic composition has high dielectric constant, low dielectric loss at 1 KHz, 1 MHz, and 60 Hz, small variation of capacitance with temperature from −55° C. to +125° C., high insulation resistance, and high dielectric breakdown voltage.

2. A ceramic dielectric composition as set forth in claim 1 which further includes 0.35 to 1.21 weight % of $La_2O_3$ or $La_2CO_3$ for improving the capacitance variation vs. DC applied voltage and the dielectric loss at high frequency (1 MHz).

3. A ceramic dielectric composition as set forth in claim 2 which further includes 0.35 to 3 weight % $SiO_2$ which significantly reduces the sintering temperature of the ceramic dielectric without deteriorating its electrical properties.

4. A ceramic dielectric composition as set forth in claim 3 which further includes 0 to 0.5 weight % MnO, or $MnCO_3$.

5. The method of making the composition of claim 1 which consists essentially of precalcining the mixture of $SrTiO_3$, $TiO_2$ and $Bi_2O_3$, and then adding powders of NiO to powders of the precalcine.

6. The method of making the composition of claim 4 which consists essentially of precalcining the mixture of $SrTiO_3$, $TiO_2$ and $Bi_2O_3$ and then adding the NiO, $La_2O_3$ or $La_2CO_3$, $SiO_2$, MnO or $MnCO_3$.

7. The method of making the composition of claim 4 which comprises mixing without precalcining or prefiring powders of $SrTiO_3$, $TiO_2$ and $Bi_2O_3$, adding the NiO, $La_2O_3$ or $La_2CO_3$, $SiO_2$, MnO or $MnCO_3$ and then firing the mixture.

* * * * *